Jan. 17, 1956     S. G. JOHNSON     2,730,808
TAPER GAGE HAVING MEANS FOR GAGING SMALLER DIAMETERS
Filed Oct. 4, 1950     3 Sheets-Sheet 1

INVENTOR.
STANLEY G. JOHNSON
BY
Bohleber, Jassett + Montstream
ATTORNEYS

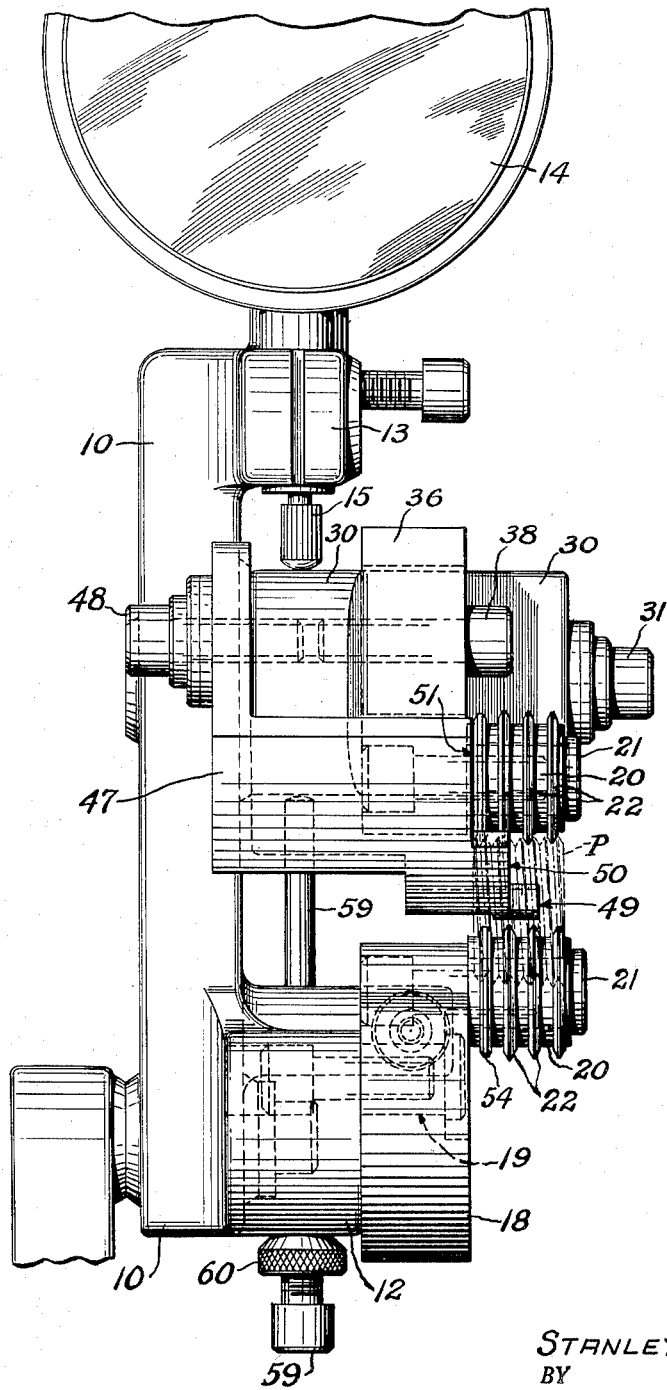

Jan. 17, 1956     S. G. JOHNSON     2,730,808
TAPER GAGE HAVING MEANS FOR GAGING SMALLER DIAMETERS
Filed Oct. 4, 1950     3 Sheets-Sheet 3

*INVENTOR.*
STANLEY G. JOHNSON
BY
Bohleber, Fassett & Montstream
*ATTORNEYS*

United States Patent Office 2,730,808
Patented Jan. 17, 1956

2,730,808

TAPER GAGE HAVING MEANS FOR GAGING SMALLER DIAMETERS

Stanley G. Johnson, Bloomfield, Conn., assignor, by mesne assignments, to The Johnson Gage Development Company, a corporation of Connecticut Application October 4, 1950, Serial No. 188,349

26 Claims. (Cl. 33—174)

The invention relates to a gage for determining whether or not a tapered test part is within allowable tolerances. The gage is suitable for test parts having plain or smooth tapered surfaces although it finds its greatest usefulness in connection with the test of a tapered thread. For a tapered thread test part, the gage in its preferred complete construction tests the small diameter end or the starting thread for over-all acceptability, for taper or lead error, and for pitch diameter of the starting thread. The gage finds its greatest usefulness as a comparator in which an indicator is used to indicate the test part's conformity with a master part or any deviation therefrom.

It is an object of the invention to construct a gage which tests the first thread for its over-all acceptability as well as its pitch diameter, and also tests the taper or lead or a combination of error of both lead and taper.

Another object is to provide a gage which tests a tapered test part for starting dimension or acceptability, over-all acceptability, taper and minimum diameter.

Another object is to provide a comparator type gage for taper threads which tests the over-all acceptability of the thread and tests the pitch diameter of the starting thread.

Another object is to construct a comparator type tapered thread gage having means for fixing the extent of axial movement of the test part in three stages or positions.

Another object of the invention is to provide a comparator for a tapered thread having a means for limiting axial movement or positioning the test part in at least two positions in one axial direction and one position in the opposite axial direction.

A still further object is to construct a comparator for a tapered thread having means for limiting axial movement or positioning of the test part in three positions in one axial direction and to one position in the opposite axial direction.

Other objects of the invention will be more apparent from the following description when taken in connection with the accompanying drawings illustrating a preferred embodiment thereof in which:

Figure 2 is a top view of the gage of Figure 1;

Figure 1:
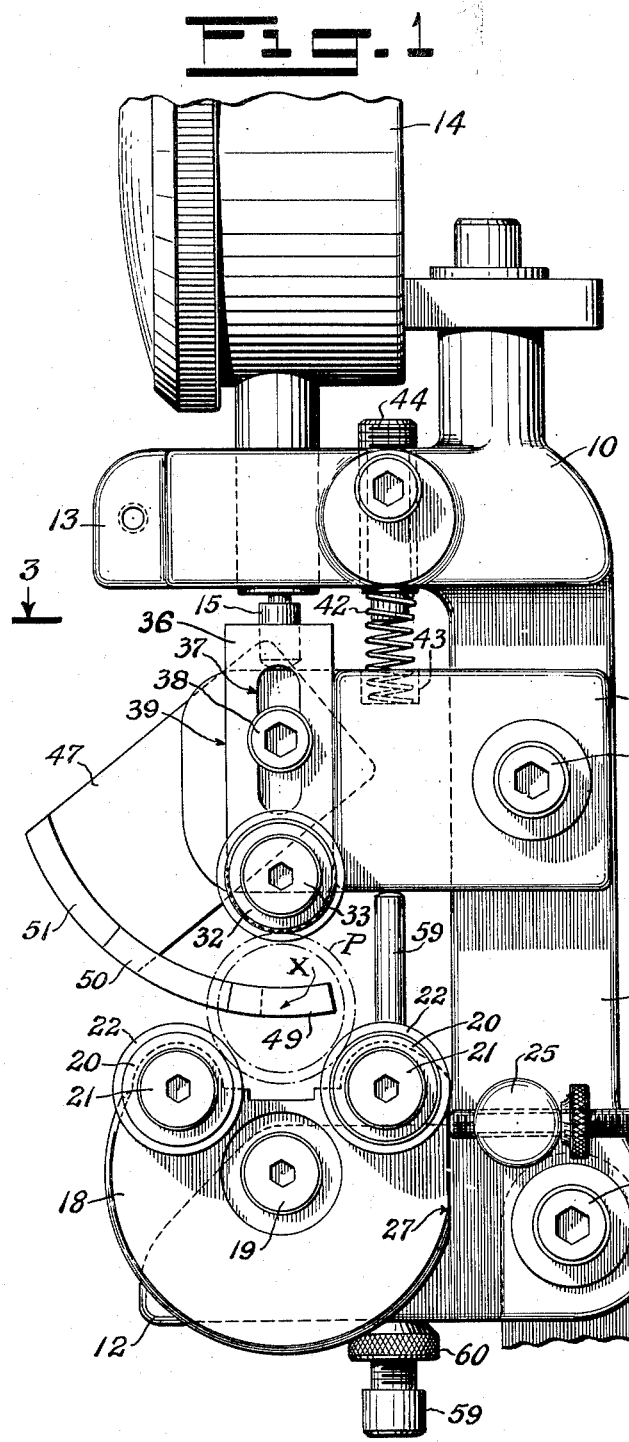
Figure 1 is a plan view of the gage with parts in gaging position and a test part therein shown in dot-dash-line.

The gage includes a frame 10 which may have a pivot bolt 11 for securing the same to a base plate whereby the gage may be adjusted to an angular position with respect thereto for a position convenient for the inspector. The frame is of general U-shaped form having an arm 12 and a second arm 13 spaced therefrom. For a comparator gage, the arm 13 carries an indicator of any suitable kind that shown being a dial indicator 14 having a pointer moving over a scale and having an operating button 15 connected with the pointer. The frame has an unobstructed opening therethrough so that a test part can be inserted from either direction between the arms.

The frame carries gaging means for testing a taper part and particularly a taper thread. The gaging means are carried preferably upon a gage member 18 which is pivotally secured to the frame such as by a pivot 19. The pivoted gage member amongst other advantages, permits quick insertion and removal of a test part. The gaging means may be of a suitable form which in the form particularly illustrated includes a pair of spaced gaging rolls 20 rotatably mounted upon pins 21 carried by the gage member. Additional rolls may be provided; however, for practical purposes two are sufficient.

The rolls or rollers are spaced from each other to give contact with a test part P around the periphery thereof, two rolls providing two spaced contact points. For a taper threaded test part the rolls will have gaging surfaces such as the surfaces provided by gaging ribs 22. The gaging ribs shown are for engagement of alternate grooves of the thread and it is to be understood that they may have ribs engaging each groove or they may be of known V form if desired to engage the flanks of one thread ridge as distinguished from a thread groove or the flanks of two adjacent thread ridges of the test part as particularly illustrated. The rolls are tapered to provide taper engagement with the test part and other forms are known and may be used.

The frame may carry a projection 25 in which is threaded a stop screw 26 the end of which abuts against a stop surface 27 on the pivoted member 18 to limit its movement to, or retain the same and the gaging means or rolls carried thereby, in gaging position.

Figure 3:
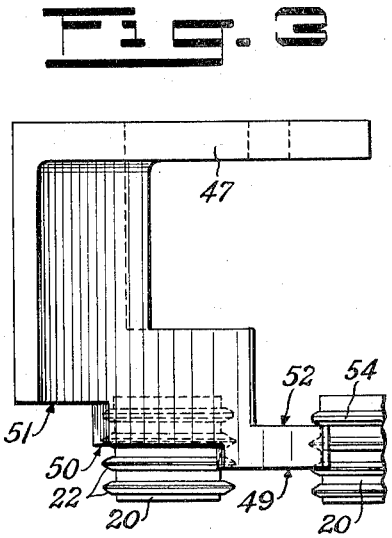
Figure 3 is a partial view of the thread gage taken on line 3—3 of Figure 1.
Figure 4:
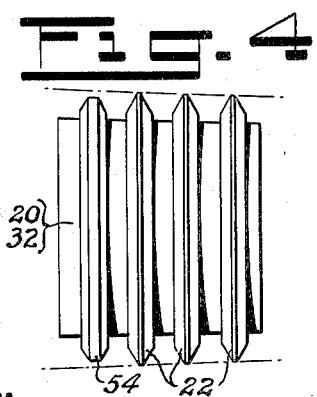
Figure 4 is an enlarged plan view of a thread roll.

A second cooperating gaging means, shown as a roller 32, is also carried by the frame which for a comparator type of gage is movable towards and away from or laterally of its cooperating gaging means 20. It is immaterial which gaging means, either that formed by the rolls 20 or by the roll 32, is laterally movable towards and away from the other; however, it is simpler to move the roller 32. The particular movement used for illustration is a pivotal movement so that the gaging means carried thereby will move towards and away from its cooperating gaging means formed by the rollers 20. The pivotal movement is of such small extent that it is essentially straight movement. A second gage member 30 is pivotally mounted upon the frame by a pivot bolt 31 and the gaging means of any suitable sort is carried by the pivoted member 30 which is shown as a gaging roll or roller 32 rotatably carried on a pivot pin 33 carried by the member 30. The roll 32 is identical with the rollers 20 shown in Figure 3. The gaging means or particularly the rolls 20 and 32 are spaced from each other as will appear more fully hereinafter. The pivot means or bolt 31 is located so that the gaging roll 32 carried by the member 30 moves towards and away from its cooperating gaging means formed by the rolls 20 carried by the member 18.

Preferably the position of the gaging roll 32 is adjustable. Any suitable adjusting means may be used; that particularly shown includes an adjustable slider 36 having a slot 37 therein which receives a bolt 38 for locking the adjustable slider and its gaging means or roll 32 in adjusted position. The bolt 33 for the gaging roll 32 is threaded into the adjustable slider 36. The slider is guided as desired such as by a groove 39 in the pivoted member 30.

For a comparator style of gage, means may be provided for projecting the laterally movable gaging means or roll 32 towards its cooperating gaging means or rolls 20 that illustrated including a spring 42 one end of which abuts against the second pivoted member 30 and may be anchored in a hole 43 therein. The other end of the spring may be received over an adjusting screw 44 which is threaded into the arm 13 of the frame.

Movement of the operating button 15 of the indicator 14 moves a pointer over a scale to indicate the movement of the gaging means or roll 32. This is accomplished by having the operating button engage the back surface of the movable member 30. For direct measurement the operating button 15 should engage the frame approximately on the gaging axis or in line with a plane through the axis of the gaging roller 32 or its pivot pin and the pivot bolt 19. If magnification should be desired the operating button may engage the frame at a greater distance from the pivot 31.

Mean are provided for limiting the extent of axial movement or to position a test part P axially with respect to the gaging means or rollers 20 and 32 to at least one position. The limit means may be in the form of one or more lands, ledges or abutments which are movable between the gaging means and to be engaged by a test part if it is a comparator type of gage or the end of the test part to be related thereto for a fixed type of gage. For the sake of simplicity the lands are carried by a single limit member 47 which is movable in any desired way between the cooperating gaging means 20 and 32 into the gaging space or area, the movement particularly shown being a pivotal movement. The limit member 47 is mounted upon a pivot 48 carried by any part of the gage and shown particularly carried by the pivot member 30. The spacing of the gaging rollers provides a slot into the gaging means through which the limit means are projected.

The limit means comprises at least one land or abutment on one face thereof movable to a position to be engaged by or related to the end of a test part. Three lands 49, 50 and 51 are shown facing towards the larger end of the gaging means which when the latter are rolls face towards the smaller end of the rolls. Another limit means or land 52 is shown as carried on the limit member 47 on the opposite edge or face thereof so that it faces in the other axial direction or towards the smaller diameter end of the gaging means, corresponding with the smaller diameter end of a taper test part. The limit member may have only the land 52; however, such a gage does not have all of the test capabilities provided by additional lands or limit means.

The gaging rolls have a rib 54 which is the largest diameter rib in the roll form of gaging means or the last rib on the roll and corresponds with the smaller end of the gaging means or test part. This rib engages the smaller diameter or starting thread of a test part P. This rib may be truncated and also may be narrower so that the inclined flanks of the rib engage at or approximately at the pitch diameter of the thread or pitch circle of the thread. In all other respects the rib 54 is like that of the ribs 22 excepting with respect to the diameter because it has to be larger in order to adapt it to engage the smaller diameter end of a test part bearing in mind that each rib 22 progressively increases in diameter since the ribs progressively engage relatively smaller diameters of a taper thread. This rib 54 is a truncated rib when it is desired to use the gage to test the pitch diameter of the starting thread of a test part. This test is made by turning the test thread around and presenting the first or smaller diameter thread to the gaging rollers from the other end with the end of the test part engaging the land 52. Even though this rib is truncated it engages the test thread and participates also in the gaging operation for over-all acceptability of the test thread and for taper and lead of the taper thread on the test part. It will be seen, therefore, that the single gage will give a more comprehensive or extensive test of the test part than was possible heretofore.

Figure 5:
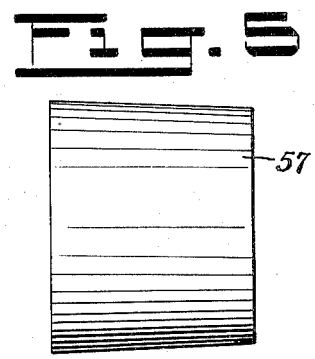
Figure 5 is an enlarged plan view of a plain cylindrical tapered roll.

If a plain surfaced tapered part is to be gaged, a plain surfaced gaging means or roll 57 is provided as shown in Figure 5. Such a roll may be used also to test the outside diameter and taper of a test thread. In such case the rolls 57 are substituted for the rolls 20 and the roll 32. It is to be understood too that the roll 32 may be substituted by a pivot member 18 carrying a plurality of gaging rolls 20 which for two rolls as particularly illustrated would provide a gage giving four-point contact around the periphery of a test part as distinguished from the three-point contact in the gage illustrated. For practical purposes the three-point contact of three gaging rolls is adequate to enable any eccentricity of a test part to participate in the indicator reading and to support the test part.

A stop is provided to limit the movement of the movable gaging means 32 and particularly the pivoted member 30 towards the gaging means 20. The stop may take many forms, that shown being a rod 59 threaded into the arm 12 of the frame and locked in position by a lock nut 60.

The gage is used by taking a test part P and pivoting the gage member 18 upwardly to open the gage relatively to the gage roller 30. The first thread of the test part is then laid against the rollers 20 and the test part and pivoted member with its gaging rollers pivoted into gaging position against the stop 26 as illustrated in Figure 1. The limit member 47 is then moved to bring the land 49 in position to be engaged by the end of the test part. The test part is then rotated until it lightly abuts the abutment, ledge or land 49. It is clear that the gaging member 18 may be held in gaging position against the stop 26 as shown in Figure 1 and the test part threaded therein until its end engages the land 49. The indicator will then show whether or not this end of the test part is within the allowable tolerances. If the indicator has been set to read zero with a master plug abutting the land 49 then the indicator reading at zero reading or within a selected range of plus or minus from zero reading will indicate whether or not the starting thread is within the allowable tolerances. Since the ribs 22 give full contact with the flanks of the thread groove, this reading constitutes an over-all indication of the acceptability or inacceptability of the first thread of the test part. This test is usually given to a few pieces to give a so-called spot check of the first thread.

The limit member 47 may now be moved so that the land 50 is in position to engage the end of the test part. The test part may be threaded down or turned until the end thereof lightly engages this land. The indicator reading is noted. The member is then moved so that the land 51 is in position to be engaged by the end of the test part and it is threaded down until its end lightly engages land 51. The indicator reading is also noted. Because of the taper these two readings will differ and the amount of difference will indicate one of two errors in the test part or may be cumulative of both errors. In other words if the taper is greater than that of a master taper thread the difference between the two readings will be greater than that for the master gage or that given by tables which are available. If the taper is less than that of a master thread, the difference between the readings will be less than that for a master or that given by a table. Similarly a lead error will produce a difference in the two readings from that given by the master gage or tables. It is clear that if there is both a taper error and a lead error they will accumulate in the indicator reading and it can not be determined which error it may be or whether both errors exist in the test part. It may be too, that the two errors may be self-corrective so far as the indicator reading is concerned. With the end of the test part engaging the land 51, the indicator reading gives an over-all test for the whole thread of the test part and if the reading is within the allowable tolerances it will be accepted. In this gaging operation it will be noted that the truncated rib 54 participates fully with respect to proper taper determination and proper lead determination even though it does not give full flank contact with the small diameter thread of the taper thread on the test part.

In order to obtain a reading as to the pitch diameter of the starting or first thread of the test part, the test part is removed from the gage such as by swinging the gaging member 18 upwardly to open position. The limit member 47 is then moved or pivoted so that the land 52 is in position to engage the end of the test part. The test part is then turned around so that its smaller end faces the smaller end of the gage and inserted into the gage by pivoting the pivoted member 18 to gaging position or threading the test part therein until its end lightly engages the land 52. The indicator reading is noted as to whether or not the starting pitch diameter is within the allowable tolerances as determined by comparison of the reading with that of a master gage marked on the indicator. Since the ribs 54 are truncated and engage at or in the region of the pitch diameter of the first thread this reading is that of the pitch diameter of the first thread of the test part.

It is clear that the gage may be constructed with a limit means including lands or ledges 51 and 52 alone. The gage so constructed would not provide as much information about the test thread. Also the gage may be provided with only three lands 51, 52 and one of the lands 50 or 49. From a practical standpoint the land 50 is preferable because it takes less time to thread the test part from land 50 to land 51 which is shown as spanning three thread ridges. The span or separation between lands 50 and 51 may be one or more thread ridges; the greater the span results in greater accuracy in determining taper and/or lead error.

The gaging means particularly illustrated may be replaced by segments having concave gaging surfaces as shown in the Johnson Patents 2,433,516 and 2,432,160. For a taper thread gage having such segments the first thread at the smaller diameter end is truncated as is the ridge 54 herein. The spaced segments provide a slot into the gaging means through which the limit means is projected.

Figure 6:
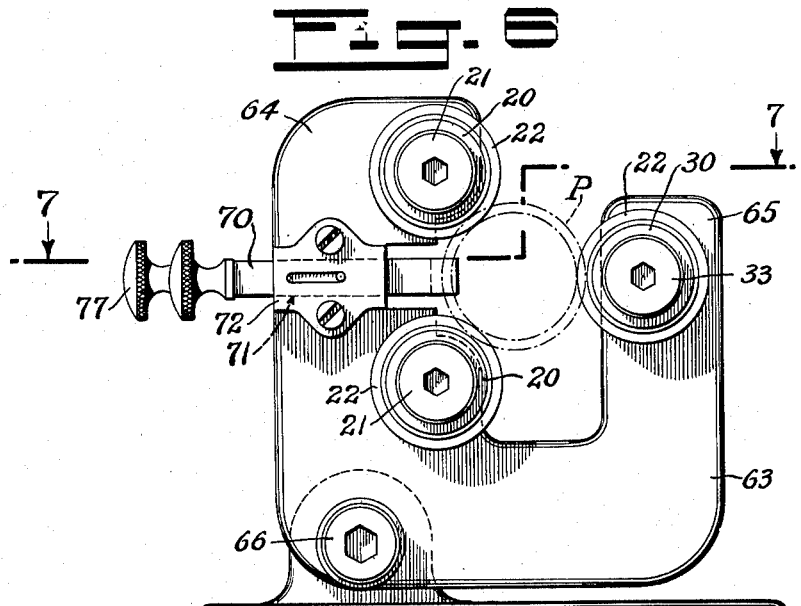
Figure 6 is a plan view of a gage with fixed gaging means.
Figure 7:
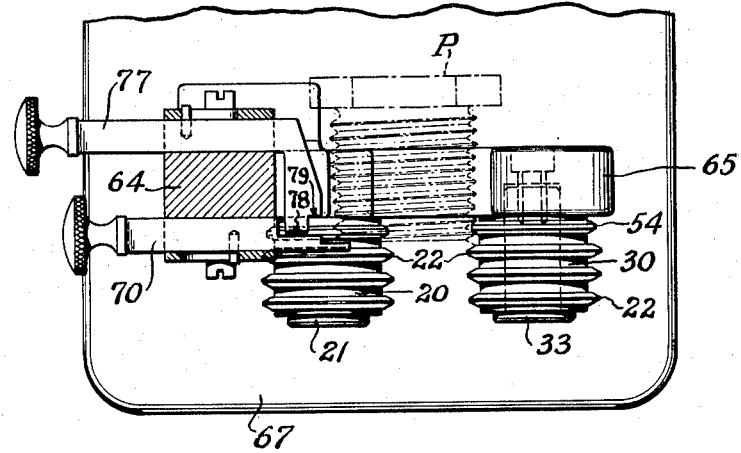
Figure 7 is a view taken on line 7—7 of Figure 6.
Figure 8:
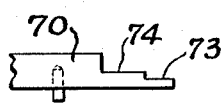
Figure 8 is a partial view of a tolerance tester.

The construction of the invention is applicable to a fixed type of thread gage as illustrated in Figures 6 and 7. A frame 63 is provided which permits access to both ends of the gaging means or rolls. A generally U-shaped frame is shown having arms 64, and 65. The frame may be adjustably mounted such as upon a bolt 66 by which it may be attached to a suitable base 67. The arm 64 carries gaging means which preferably is in the form of a pair of rollers 20 mounted upon a pivot pin 21 and the arm 65 carries a cooperating gaging means shown as a gaging roll 32 mounted upon a pivot pin 33 which may be an eccentric pin for adjusting its position relatively to the gaging rollers 20. As in the comparator type of gage the gaging rolls 20 and 32 are identical.

The frame carries a limit means to test the location of the end of a test part therein. It is shown in the form of a slider 70 which is slidable in a guide or groove 71 and retained in place by a top plate 72. The slider has at least one limit land and for a tolerance limit gage a pair of spaced limit lands 73 and 74 may be used which face in the direction of the small diameter end of the gaging means or rollers. The limit means or lands are spaced from the small diameter end of the gaging rolls a distance related with the truncated rib 54, and is shown as being projected between or into the rolls.

In order to test the starting thread for pitch diameter, the test part P is reversed with respect to the rolls and threaded into the pitch diameter or truncated ribs 54 of the gaging means until it binds. The slider 70 is then pushed inwardly and if the land 73 passes the end of the test part it is known that this first thread is not too small. If the land 74 strikes test part, it is known that the first thread is not too large and therefore the first thread is acceptable.

A similar slider 77 carries limit lands 78 and 79 for testing whether or not a test part inserted into the gage in a normal manner from the right hand side of the gage, which is the bottom of Figure 7 as illustrated, is within the permissible tolerances. The two sliders 70 and 77 may be a single slider as taught by the limit member or means 47.

The invention is presented to fill a need for improvements in a taper gage having means for gaging smaller diameters. It is understood that various modifications in structure, as well as changes in mode of operation, assembly, and manner of use, may and often do occur to those skilled in the art, especially after benefiting from the teachings of an invention. Hence, it will be understood that this disclosure is illustrative of preferred means of embodying the invention in useful form by explaining the construction, operation and advantages thereof.

What is claimed is:

1. A gage for an externally tapered test part having a circular cross section comprising a frame, taper gaging means carried by the frame, the taper gaging means having a smaller diameter end corresponding with the smaller dimension of the test part and a larger diameter end corresponding with the larger dimension of the test part, and the taper gaging means having a laterally extending slot into the gaging means, and limit means movably mounted upon the gage for movement through the slot into the taper gaging means including at least one limit land facing towards the smaller end of the gaging means.

2. A gage as in claim 1 in which the limit land is adjacent the smaller end of the taper gaging means.

3. A gage as in claim 1 including at least one limit land movably mounted upon the gage for movement through the slot into the taper gaging means and facing the larger end of the gaging means.

4. A gage for an externally taper threaded test part having a circular cross section comprising a frame, taper gaging means for tapered threads carried by the frame composed of at least two elements and engaging at least three points around the periphery of the test part, the taper gaging means having a smaller diameter end corresponding with the smaller dimension of the test part and a larger diameter end corresponding with the larger dimension of the test part, the smaller diameter thread gaging means being truncated to engage the thread of the test part in the region of its pitch diameter, the gaging means being spaced from each other, and limit means mounted upon the gage for movement between the spaced taper gaging means into the gaging area including a limit land facing the smaller end of the gaging means.

5. A gage as in claim 4 in which the limit means also includes at least one limit land facing towards the larger end of the gaging means.

6. A gage as in claim 4 in which the limit means also includes a pair of limit lands facing towards the larger end of the gaging means and spaced from each other.

7. A gage as in claim 6 in which the limit means is one member and the plurality of lands are carried by the one member.

8. A comparator gage for an externally tapered test part having a circular cross section comprising a frame, a first taper gaging means carried upon the frame, a gage member having taper gaging means for cooperating with the first gaging means to test a tapered part, the cooperating taper gaging means having a smaller end corresponding with the smaller dimension of the test part, means mounting the gage member for movement of its gaging means towards and away from the other gaging means and with a space between the cooperating gaging means, limit means mounted upon the gage for movement between the gaging means into the gaging area including a limit land facing the smaller end of the gaging means and spaced therefrom, and means to indicate the position of the movable gaging means.

9. A comparator gage as in claim 8 in which the limit means includes a land facing towards the larger end of the gaging means.

10. A comparator gage as in claim 8 in which the limit means includes a plurality of lands facing toward the larger end of the gaging means and spaced with respect to each other.

11. A comparator gage as in claim 9 in which the lands are carried by a single limit member.

12. A comparator gage as in claim 10 in which the lands are carried by a single limit member.

13. A comparator gage for an externally taper threaded test part having a circular cross section comprising a frame, a first tape thread gaging means carried upon the fame, a gage member, taper thread gaging means carried by the gage member for cooperating with the first gaging means to test a taper threaded part, the cooperating taper gaging means having a smaller dimension end corresponding with the smaller dimension of the test part and a larger dimension end corresponding with the larger dimension of the test part, means mounting the gage member for movement of its gaging means towards and away from the other gaging means and with a space between the cooperating gaging means, limit means mounted upon the gage for movement between the gaging means into the gaging area including a limit land facing the smaller end of the gaging means and spaced therefrom, and means to indicate the position of the movable gaging means.

14. A comparator gage as in claim 13 in which the thread gaging means at the smaller end is truncated to engage the thread of a test part in the region of its pitch diameter.

15. A comparator gage as in claim 13 in which the limit means includes at least one land facing toward the larger diameter end of the gaging means.

16. A comparator gage as in claim 13 in which the limit means includes a plurality of spaced lands facing towards the larger diameter end of the gaging means.

17. A comparator gage as in claim 16 including a single limit member carrying all of the limit lands.

18. A comparator gage as in claim 17 including pivot means carried by the gage pivotally mounting the limit member.

19. A comparator gage as in claim 18 including the thread gaging means at the smaller diameter end being truncated.

20. A comparator gage for an externally tapered test part having a circular cross section comprising a frame, a first thread gaging means carried upon the frame, a gage member, a second thread gaging means carried by the gage member, the thread gaging means forming cooperating taper gaging means having a smaller dimension end corresponding with the minimum dimension of the test part and a larger diameter end corresponding with the larger dimension end of a test part, means mounting the gage member with its gaging means for movement towards and away from the other gaging means and with a space between the gaging means, limit means mounted upon the gage for movement between the gaging means including a plurality of limit lands spaced from each other and facing the larger end of the gaging means and spaced therefrom, and means to indicate the position of the gage member.

21. A comparator gage as in claim 20 in which the limit means includes a limit member pivotally mounted upon the gage and carrying the limit lands.

22. A gage for an externally tapered test part having a circular cross section comprising a frame having an unobstructed opening therethrough, taper gaging means fixedly mounted upon the frame, the taper gaging means having a smaller end corresponding with the minimum dimension of a tapered test part, the gaging means having a lateral slot thereinto, and limit means mounted upon the gage for movement into the slot of the gaging means including at least one limit land facing the smaller end of the gaging means.

23. A gage for an externally tapered test part having a circular cross section comprising a frame having an unobstructed opening therethrough, taper gaging means fixedly mounted upon the frame, the taper gaging means having a smaller end corresponding with the minimum dimension of a tapered test part, the gaging means having a lateral slot thereinto, limit means mounted upon the gage for movement into the slot of the gaging means including at least one limit land facing the smaller end of the gaging means, and the limit means including a pair of spaced limit lands.

24. A gage for an externally tapered test part having a circular cross section comprising a frame having an unobstructed opening therethrough, taper gaging means fixedly mounted upon the frame, the taper gaging means having a smaller end corresponding with the minimum dimension of a tapered test part, the gaging means having a lateral slot thereinto, limit means mounted upon the gage for movement into the slot of the gaging means including at least one limit land facing the smaller end of the gaging means, and the taper gaging means having thread gaging surfaces, and the smaller diameter thread gaging means being truncated.

25. A gage for an externally tapered test part having a circular cross section comprising a frame having an unobstructed opening therethrough, taper gaging means fixedly mounted upon the frame, the taper gaging means having a smaller end corresponding with the minimum dimension of a tapered test part, the gaging means having a lateral slot thereinto, limit means mounted upon the gage for movement into the slot of the gaging means including at least one limit land facing the smaller end of the gaging means, and the limit means includes at least one limit land movably mounted upon the gage for movement into the gage means and facing toward the larger diameter end of the gaging means.

26. A gage for an externally tapered test part having a circular cross section comprising a frame having an unobstructed opening therethrough, taper gaging means fixedly mounted upon the frame, the taper gaging means having a smaller end corresponding with the minimum dimension of a tapered test part, the gaging means having a lateral slot thereinto, limit means mounted upon the gage for movement into the slot of the gaging means including at least one limit land facing the smaller end of the gaging means, and the limit means includes a pair of limit lands mounted for movement into the gaging means and facing toward the larger diameter end of the gaging means.

References Cited in the file of this patent

UNITED STATES PATENTS

| | | |
|---|---|---|
| 1,610,909 | Wetmore | Dec. 14, 1926 |
| 1,661,722 | Hansen | Mar. 6, 1928 |
| 1,908,253 | Johnson | May 9, 1933 |
| 2,432,160 | Johnson | Dec. 9, 1947 |
| 2,435,268 | Childs | Feb. 3, 1948 |
| 2,437,160 | Johnson | Mar. 2, 1948 |
| 2,559,771 | Johnson, P. W. | July 10, 1951 |

FOREIGN PATENTS

| | | |
|---|---|---|
| 710,881 | Germany | Sept. 23, 1941 |